United States Patent [19]
Bird et al.

[11] 3,895,642
[45] July 22, 1975

[54] METHOD AND APPARATUS FOR MIXING GASES

[75] Inventors: Forrest M. Bird; Henry L. Pohndorf, both of Sandpoint, Idaho

[73] Assignee: Bird Corporation, Palm Springs, Calif. ; a part interest

[22] Filed: Jan. 21, 1974

[21] Appl. No.: 435,320

Related U.S. Application Data

[60] Continuation of Ser. No. 316,849, Dec. 20, 1972, abandoned, which is a division of Ser. No. 54,934, July 15, 1970, Pat. No. 3,727,627.

[52] U.S. Cl. ............................... 137/7; 137/505.12
[51] Int. Cl. .......................................... G05d 11/03
[58] Field of Search ..... 137/7, 98, 100, 101, 505.12

[56] References Cited
UNITED STATES PATENTS

| | | | |
|---|---|---|---|
| 1,798,317 | 3/1931 | Eaton | 137/100 |
| 2,145,114 | 1/1939 | Gibbs et al. | 137/100 X |
| 2,780,412 | 2/1957 | Holley | 137/98 X |
| 3,182,677 | 5/1965 | Thiem | 137/98 |
| 3,443,583 | 5/1969 | Webb | 137/505.12 |
| 3,565,289 | 2/1971 | Erickson | 137/100 X |
| 3,605,785 | 9/1971 | Dobritz | 137/98 |

*Primary Examiner*—Robert G. Nilson
*Attorney, Agent, or Firm*—Flehr, Hohbach, Test, Albritton & Herbert

[57] ABSTRACT

A method and apparatus for mixing gases from separate pressurized gas circuits for use in applications such as medical respirators. The pressures of the gases in the two circuits are accurately balanced to provide an equal pressure drop across a differential mixing valve for precise control of the ratio of flow rates of the gases being mixed. In one embodiment, a double stage pressure balancing mechanism is provided for increased accuracy of pressure balance.

2 Claims, 6 Drawing Figures

PATENTED JUL 22 1975

3,895,642

SHEET 1

METHOD AND APPARATUS FOR MIXING GASES

This application is a continuation of application Ser. No. 316,849, filed Dec. 20, 1972, now abandoned, which is a division of application Ser. No. 54,934, filed July 15, 1970, now U.S. Pat. No. 3,727,627.

BACKGROUND OF THE INVENTION

Mechanical respirators are used as pulmonary ventilators in the therapeutic management of cardiopulmonary or other physiological conditions of a patient. These respirators are operated by a compressed gas source, such as the 50 psi compressed oxygen source which is commonly plumbed in hospital rooms. When plumbed oxygen is not available, commercial high-pressure oxygen cylinders are used to provide high-pressure oxygen storage, and reduction regulators are used to reduce this pressure to the 50 psi driving pressures of the respirators.

The advent of the routine use of oxygen-powered medical respirators has led to an increased incidence of oxygen toxicity, and the need has been recognized for a practical and ethical method and apparatus for accurate control of oxygen delivery to a patient for reducing the danger of oxygen toxicity.

Physiologically, the average patient receiving pulmonary therapy does not require oxygen tensions or pressures above ambient 21 percent. There are, however, a sufficient number of medical respirator patients with diffusion and profusion alterations to warrant elevated oxygen tensions in the inspired respiratory gases.

With the advent of a practical clinical means for the rapid analysis of arterial oxygen tensions, the need for a respirator delivering exact oxygen tensions is justified. By looking at the arterial oxygen levels of a patient being ventilated with a mechanical ventilator, the total therapeutic efficiency can be determined. If the ventilator is maintaining a ventilatory level sufficient to maintain the normal carbon dioxide tensions, arterial oxygen tensions can be theoretically adjusted to desired levels by increasing or decreasing oxygen tensions until desired arterial titration is achieved. Accordingly, the need has been recognized for a method and apparatus effective to provide accurate oxygen tension adjustments.

Existing medical respirators commonly employ a venturi both as an oxygen-air dilution system and a pneumatic clutch functioning against pulmonary resistances. The dilutor venturi of these respirators allows mechanical selection of oxygen concentrations within the range of 40 to 100 percent, but these calibrations are not accurate when the variables associated with mechanical ventilation of the lung are considered. Thus, a medical respirator rated at 40 percent dilution may deliver oxygen tensions as high as 100 percent at the top of inspiration. The original 40 percent index is primarily increased by nebulizer flow and secondarily by progressive venturi entrainment breakdown as pressures distal from the lung rise. The mean oxygen concentration would be somewhere between 40 percent and 100 percent, dependent upon driving pressures at the venturi jet, nebulizer flow, and pulmonary resistances.

Medical respirators utilizing the venturi as a pneumatic clutch create nonlinear gross pulmonary resistance during inspiration as a result of variables such as elastic and non-elastic resistances within pulmonary structures. When a venturi with a constant driving pressure functions against variable pulmonary resistance, a variable flow results. A venturi functioning as a reciprocal flow pressure converter serves to enhance the distribution of inspired gases during mechanical ventilation of the lung.

Conventional means of delivering elevated oxygen tensions in inspired gases with a venturi stabilized mechanical ventilator include that of powering the respirator by oxygen in lieu of compressed air. Compressed air can be used as a primary motivating gas with supplemental oxygen added into the breathing circuit to obtain higher tensions. Another method is to pre-mix oxygen and other respiratory gases and deliver the mixture through the venturi. The same gas must be supplied on demand to satisfy venturi entrainment.

Another existing method employs the mixing of oxygen and air in a metering system which combines the gases in a controlled ratio of flows of each gas. The metering system of this method provides two adjustable orifices linked together by mechanical means so that the orifice area for one gas is increased as the orifice area for the other gas is decreased. The orifice areas are controlled by needle valves mounted on independent shafts and mechanically linked by a gear arrangement to a percent oxygen control. The means used to balance and control the pressures so that the pressure drop across the metering system is equal for both gases comprises the use of two separate flow controllers located downstream from the metering system and functioning from pressure references from the inlet and outlet gases to maintain the ratio of flows as selected by the metering system. The pressure drop across the metering system is equalized by varying the pressures downstream from the metering orifices with reference to the inlet and outlet pressures. This method is not entirely satisfactory as a result of certain design limitations and inherent sources of error in flow control. A regulator must be employed for the downstream pressure, and an alarm system must be employed to indicate low outlet pressures inasmuch as the system may continue to operate if one of the gas supplies fails. If the differential in inlet gas pressure varies more than 5 psi, an ever-increasing error develops. Further, constant ambient bleed of gas totaling approximately 9 liters/minute must be maintained to obtain a 95 percent accuracy, and accuracy drifts progressively when constant or intermittent flows below 15 liters/minute are demanded.

Accordingly, the need has been recognized for a gas mixing method and apparatus providing a high degree of flow and pressure control accuracy, which is smaller, lighter, less expensive and more versatile than existing designs, and which is capable of delivering controlled oxygen ratios to patients by means of respirators, ventilators and free flow apparatus.

SUMMARY OF THE INVENTION AND OBJECTS

This invention relates generally to methods and apparatus for mixing the flow from separate pressurized gas sources for use in applications such as medical respirators and the like.

It is an object of the invention to provide a method and apparatus for controlling the mixing of separate pressurized gases.

Another object is to provide a method and apparatus for the differential mixing of gases in separate pressurized gas circuits for delivery into a flow path at preselected, accurately controlled ratios.

Another object is to provide a method and apparatus of the type described to provide an equal pressure drop in each of two separate pressurized gas circuits across differential mixing valve means controlling the ratio of flows of the two gases for mixing into a delivery flow path.

Another object is to provide a method and apparatus for mixing oxygen with respirator, therapeutic, or anesthetic gases with accurate and selectively adjustable pressures and flow rates for use in applications such as a mechanical respirator for therapeutic management of physiological conditions.

The invention broadly provides a method and apparatus for controlling the mixing of gases in separate pressurized gas circuits in which pressure balance means are employed as the first stage, or alternatively, a pair of pressure balance means in series are employed, to provide a highly accurate pressure equalization in the two circuits for delivery to a differential mixing valve arrangement adapted to selectively control the ratio of flows in the two circuits for mixing into a delivery flow path.

Additional objects and features of the invention will appear from the following description in which the preferred embodiments of the invention have been set forth in detail in conjunction with the drawings.

DESCRIPTION OF THE PREFERRED EMBODIMENTS

Figure 1:
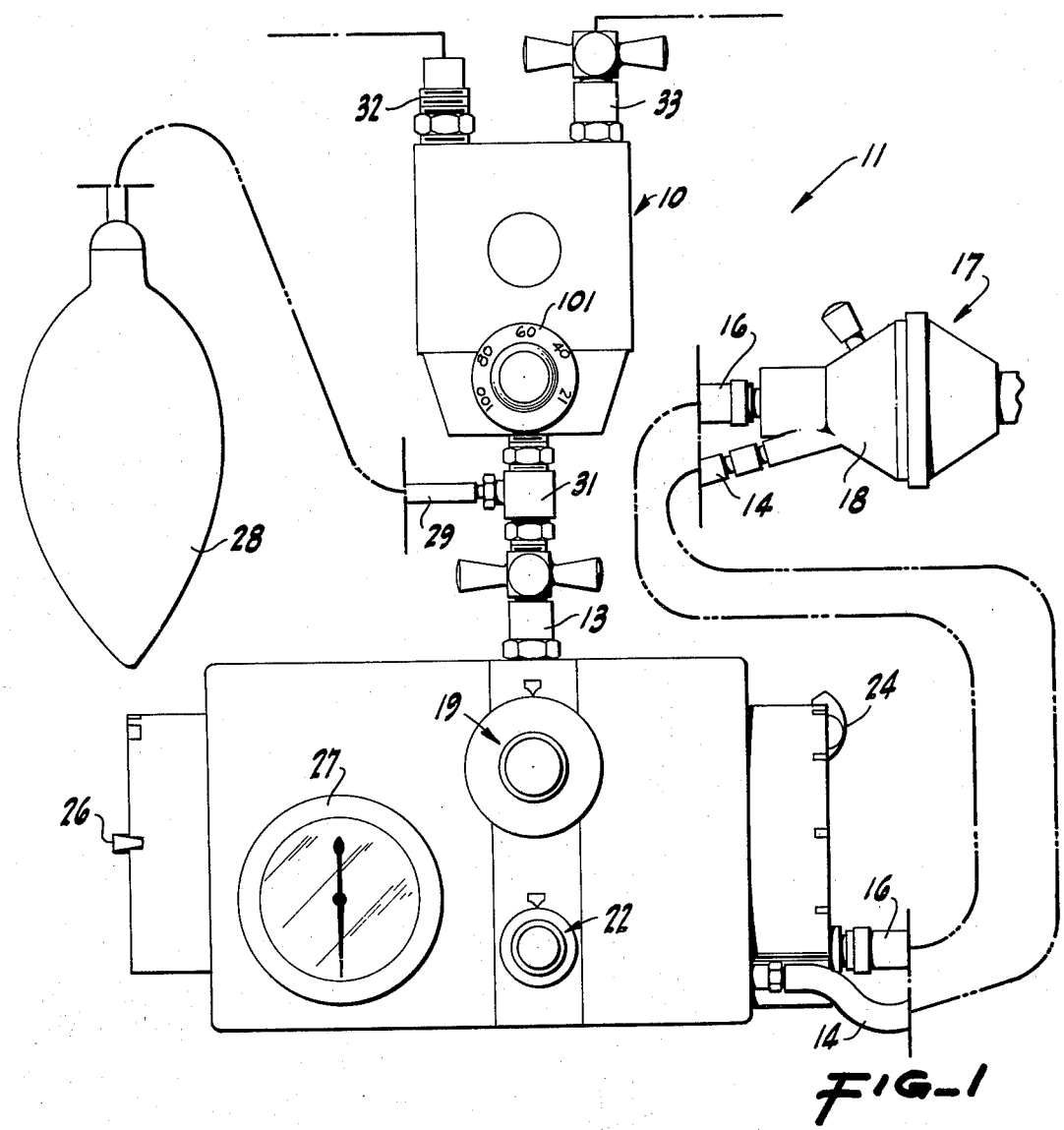
FIG. 1 is an elevational view of a preferred embodiment of the gas mixing apparatus of the invention shown in use with a mechanical respirator.
Figure 2:
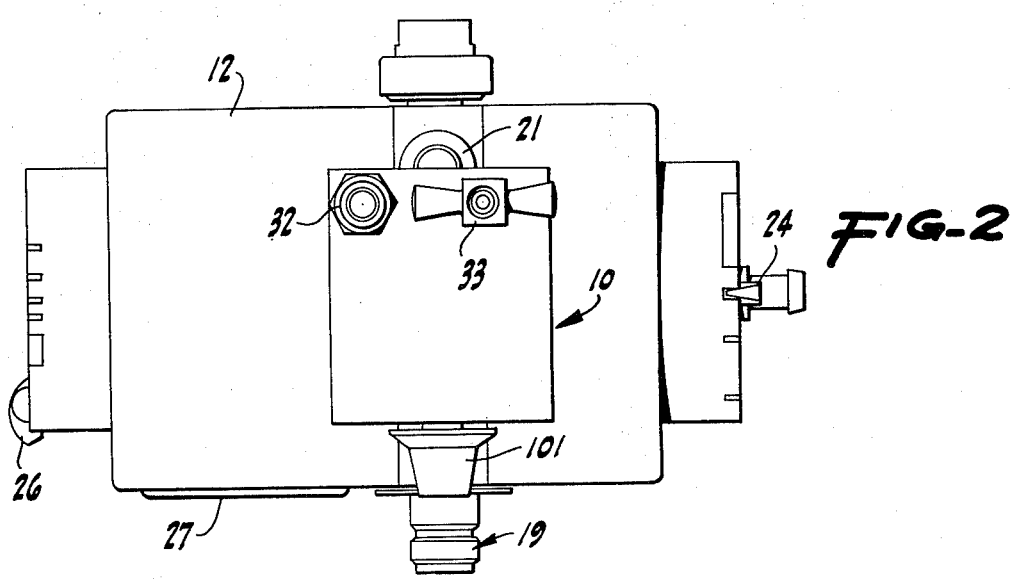
FIG. 2 is a top-plan view of the apparatus of FIG. 1.
Figure 3:
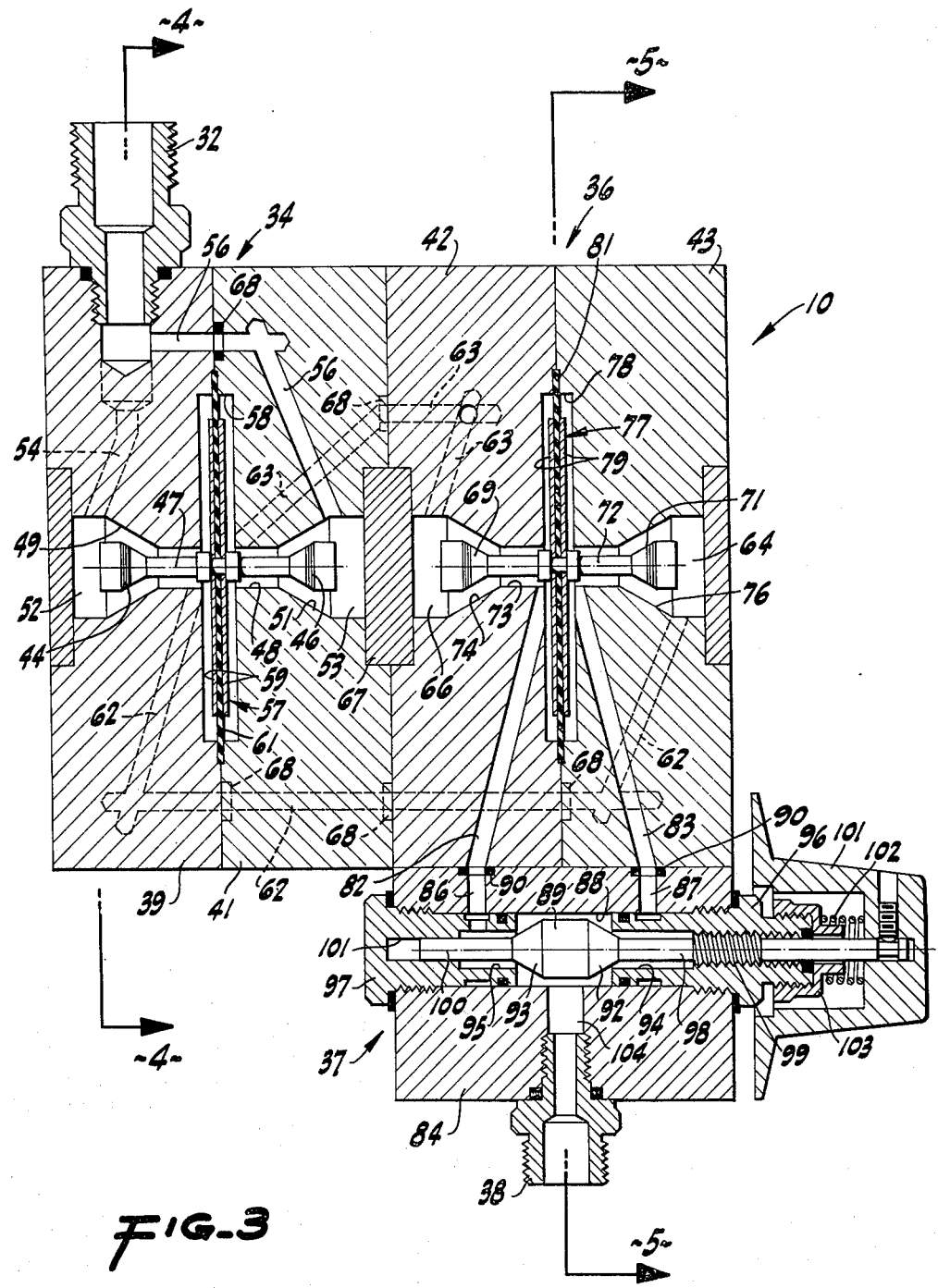
FIG. 3 is a cross-section elevational view to an enlarged scale taken along the line 3—3 of FIG. 1.
Figure 4:
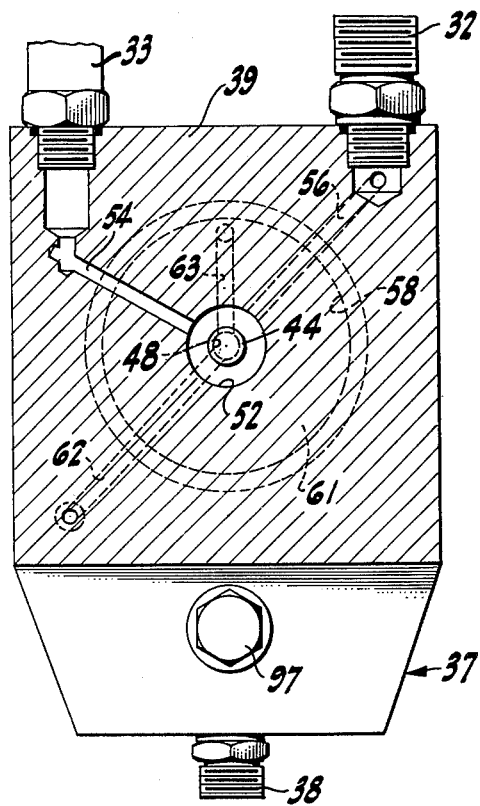
FIG. 4 is a cross-section elevational view taken along the line 4—4 FIG. 3.
Figure 5:
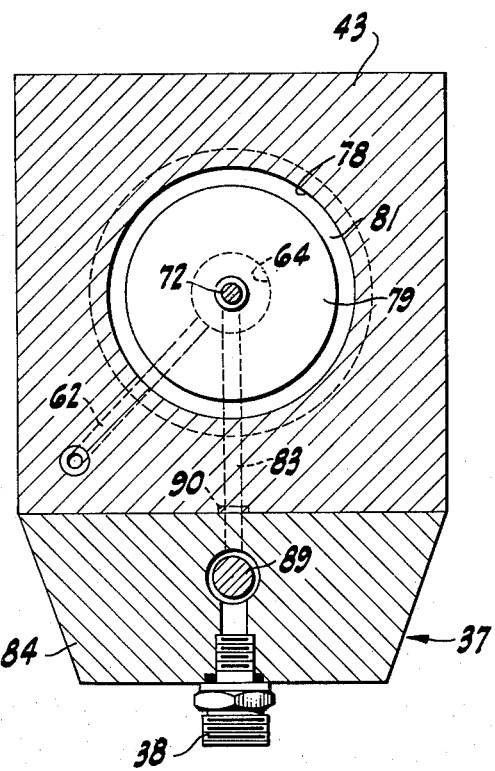
FIG. 5 is a cross-section elevational view taken along the line 5—5 of FIG. 3.

In the drawings, FIG. 1 illustrates generally at 10 an apparatus for controlling the mixing of gases in accordance with the method of the invention. Apparatus 10 is shown in operating relationship for blending a mixture of gases such as oxygen and air for delivery to a mechanical respirator indicated generally at 11. While the preferred embodiment is illustrated in conjunction with a respirator ventilating a patient's lungs it is understood that the invention will find broad application in the controlled mixing of disparate gases from separate pressurized sources for delivery to a common flow path.

The ventilating apparatus or respirator 11 may broadly be of the type disclosed in the Bird et al U.S. Pat. No. 3,331,368 issued July 18, 1967. Suffice it to say here that a respirator of the type disclosed in the Bird et al patent would in general comprise a controller 12 adapted to receive the mixture of gases under pressure through inlet 13. The controller is connected through outlet tubes 14 and 16 with a suitable patient adapter 17 provided with a nebulizer 18. Controller 12 includes an inspiratory flow rate control 19, negative pressure control 21, expiratory time for apnea control 22, inspiratory pressure control 24, sensitivity pressure control 26, gauge 27 measuring pressure in the breathing chamber, and a compliance bag or test lung 28 connected through bleeder tube 29 and connector adapter 31 with the inlet gas flow into controller 12.

Gas mixing apparatus 10 is mounted above respirator 11 and is provided with a pair of inlet fittings 32,33 adapted for connection with gas inlet tubing, not shown, from separate gas circuits or pressurized gas sources which are to be mixed or blended. In the preferred embodiment oxygen pressurized at, for example, 50 psi would be introduced into apparatus 10 through fitting 33 for blending with the desired therapeutic, anesthetic or respiratory gas, such as air, introduced under pressure through inlet fitting 32.

Apparatus 10 comprises a modular construction providing a first pressure balance stage 34, a second pressure balance stage 36 downstream of the first stage, and a differential gas mixing device 37 adapted to control the ratio of flows of the two gases during mixing for delivery through outlet fitting 38 into connector adaptor 31 of the respirator. The first and second pressure balance stages are connected in series to provide a highly accurate pressure balance between the two inlet gases so that the delivery pressures of both gases to differential gas mixing device 37 are equal and the desired gas mix is maintained as the pre-selected ratio of flows across the differential mixing device remains constant. While double pressure balance staging is illustrated as preferred for increased accuracy in pressure and flow rate control, it is understood that the invention contemplates that a single pressure balance stage could be employed.

Each of the pressure balance stages 34,36 are substantially identical in construction and are shown as defined by pairs of flat blocks of a suitable material such as a synthetic polymer. The blocks are bored and relieved to define the various cavities and gas passageways. First pressure balance stage 34 is defined by a pair of abutting blocks 39,41 and second pressure balance stage 36 is defined by a pair of abutting blocks 42,43. The four blocks are secured together in the illustrated assembled relationship by suitable means such as bolts, not shown.

First pressure balance stage 34 comprises a pair of frusto-conical flow control valve elements 44,46 mounted for conjoint movement on common valve spool 47 which is axially positioned within bore 48. The valves 44,46 regulate the flow from respective chambers 52,53 through tapered valve seats 49,51 communicating with bore 48. Chamber 52 is in communication with one gas circuit, e.g., the source of pressurized oxygen, through passageway 54 leading to fitting 33 and chamber 53 is in communcation with the other of the gas circuits, e.g., the source of pressurized air, through passageway 56 leading to fitting 32.

Pressure responsive valve operating means comprising a flexible diaphragm 57 is provided to operate control valves 44,46. The two blocks 39,41 are relieved at their interface to define a flat cylindrical cavity 58 communicating at its inner periphery with bore 48. Diaphragm 57 comprises an inner rigid disk 59 secured to valve spool 47 and bonded to a flexible annulus 61 of a suitable elastomer material mounted in fluid sealing engagement at its outer periphery between blocks 39 and 41. Diaphragm 57 divides cavity 58 into two pressure chambers each communicating with the downstream flow of gases from a respective valve 44,46. Deflection of the diaphragm responsive to an imbalance in pressure in the two chambers of cavity 58 urges valve spool 47 in an axial direction to open one of the control valves while simultaneously closing the other valve. Whichever gas circuit is at a higher pressure will produce a resultant force on the diaphragm for urging it in a direction tending to close the valve associated with the high pressure side and to conjointly and reciprocally open the other valve associated with the low pressure gas circuit a proportional amount. The reduced gas flow into the high pressure side of the diaphragm and the concomitant increased flow into the low pressure side reaches a null point at which the two gas pressures downstream of their respective valves are balanced. The pressure balanced gases next flow in series to the second pressure balance stage 36 for further refinement in a balancing of the two pressures. The gas, such as oxygen, flowing past valve 44 enters passageway 62, while the gas, such as air, flowing past valve 46 enters passageway 63.

Second pressure balance stage 36 is similar in construction and operation to that of first stage 34 and is defined by the two blocks 42,43 bored and relieved to provide a chamber 64 in communication with passageway 62 and a chamber 66 in communication with passageway 63. Chamber 66 is sealed from opposing chamber 53 of the first stage by a suitable sealing disk 67. Suitable gas sealing means, such as the O-ring type seals 68, are mounted in grooves provided at the block interfaces around each of the passages 56,62,63 to preclude escape of the pressurized gases.

Second stage 36 further includes a pair of frusto-conical flow control valve elements 69,71 mounted for conjoint movement on common valve spool 72 which is axially positioned within bore 73. Valve element 69 moves relative to tapered valve seat 74 to control gas flow from chamber 66 and valve element 71 moves relative to tapered valve seat 76 to control gas flow from chamber 64. The valve operating means for these valves comprises a flexible diaphragm 77 mounted within cavity 78. The diaphragm includes an inner rigid disk 79 secured to valve spool 72 and bonded to a flexible annulus 81 mounted in fluid sealing engagement at its outer periphery between blocks 42,43 to divide cavity 78 into two chambers communicating the pressure of gases downstream from valves 69,71 to act against the diaphragm. An imbalance in gas pressure on either side of the diaphragm produces a resultant force urging the valve spool in a direction tending to close the valve on the high pressure side while conjointly opening the valve on the low pressure side until a null point is reached at which the downstream pressures of the two gases are balanced. The gas flowing past valve 69 is directed through outlet passageway 82 while the gas flowing past valve 71 is directed through outlet passageway or delivery flowpath 83, and these two passageways in turn communicate with differential gas mixing device 37.

In the pressure balancing system of the invention final delivery pressure is always that of the inlet value of the lowest pressure gas. For example, if the oxygen inlet pressure is 50 psi and the air inlet 80 psi, final delivery pressure would be 50 psi. An important feature is that if either gas source fails, the other gas flow is automatically shut down. This is of paramount importance when a respiratory or anesthetic gas other than air is being mixed with oxygen.

In an embodiment of the invention utilizing an oxygen inlet pressure of 50 psi and an air inlet pressure of 70 psi, it has been found that the use of a single stage for pressure balancing results in an error of 25 cm $H_2O$. Greater accuracy in pressure balancing was obtained utilizing the illustrated two-stage system and with the same 20 psi inlet differential where the error was reduced to 4 cm $H_2O$, or an accuracy of 99.6 percent. The 4 cm $H_2O$ balancing error results in a ± 2 percent error in the percent of oxygen delivered.

The differential gas mixing device 37 comprises a housing 84 mounted below the pair of blocks 42,43 by suitable bolts, not shown, and with the housing formed with a pair of passages 86,87 communicating with respective passages 82,83 from the outlets of second pressure balance stage 36. Suitable sealing means such as O-ring type seals 90 are mounted in grooves formed in the interface between housing 84 and the underside of blocks 42,43 for precluding gas escape from the passages.

Differential gas mixing device 37 further comprises a backlash-free metering valve for establishing a predetermined ratio of the flow rates for the two gases being mixed or blended. Housing 84 is formed with a bore 88 receiving a valve spool 89. Valve spool 89 is formed with opposed frusto-conical valving ends 92,93 having identical tapers and diameters and adapted to move in relation to respective orifices 94,95 formed with identical diameters in bushings 96,97 threadably received in bore 88. An operating shaft 98 mounted at one end of the valve spool is provided with external threads 99 engaging internal threads formed in bushing 96. A shaft 100 at the other end of the valve spool is of identical diameter to that of shaft 98 and extends through orifice 95 for support on a bearing 101. The distal end of shaft 98 projects from the housing for attachment by a set screw with an oxygen percent control knob 101. Suitable compression spring means 102 is provided between the inner cavity of knob 101 and a retainer nut 103 on bushing 96 to urge the valve spool shaft outwardly in an axial direction to eliminate thread backlash. Suitable calibrations are provided on the control knob for indicating the desired range of oxygen mixing, which is from 21–100 percent in the illustrated embodiment. Manual angular adjustment of the control knob displaces valve spool 89 so that the flow areas of orifices 94,95 are reciprocally opened and closed by the translatory movement of tapered ends 92,93. The gases moving past the two orifices enter the central segment of bore 88 serving as a central mixing chamber. This mixing chamber delivers the mixed gas into bore 104 and outlet fitting 38. Since the gas pressures delivered to the differential gas mixing device are balanced to a high degree of accuracy, and since the pressures downstream of the orifices are equal in the mixing chamber, the pressure drop across the orifices will be equal for both gases. As a result, the preselected ratio of gas flows for mixing will be maintained at a constant value regardless of differences in inlet pressures and flow rates. The invention thus will provide automatic compensation for any changes in inlet pressures.

Figure 6:
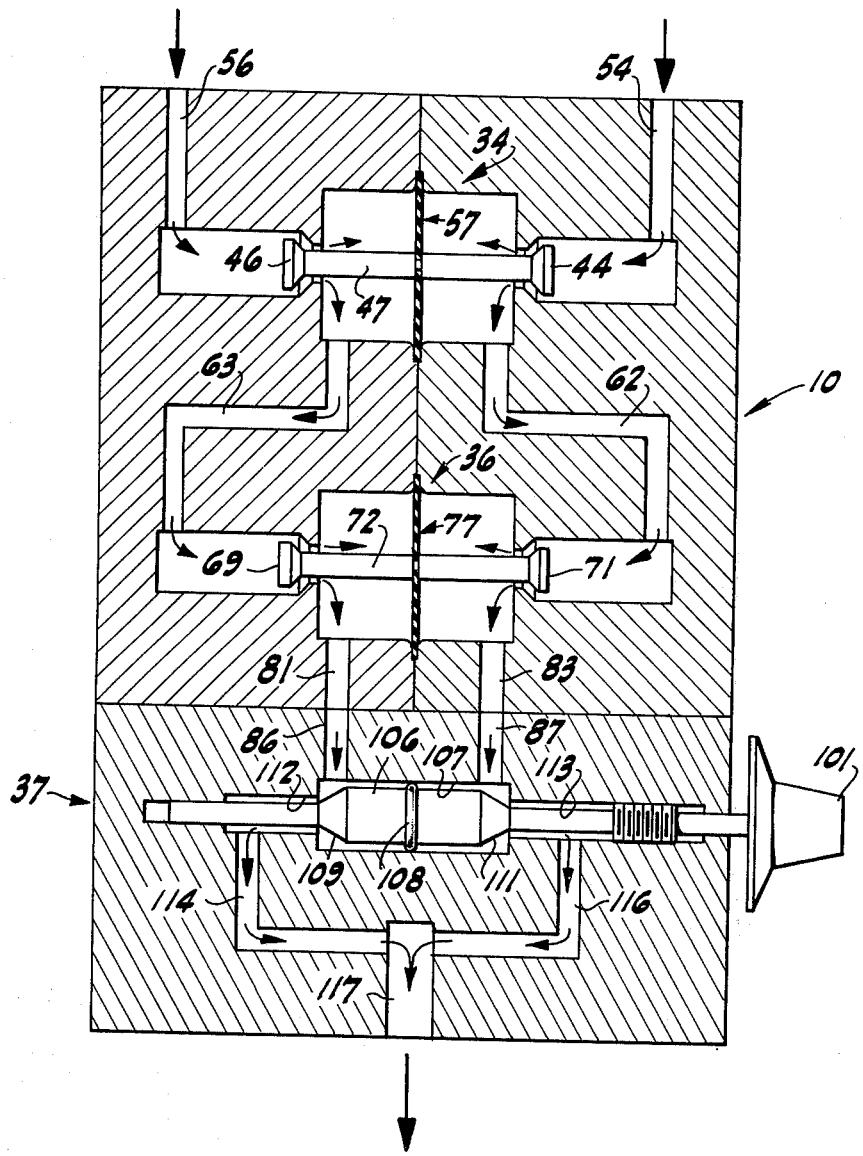
FIG. 6 is a partially schematic view of the apparatus of the invention illustrating the operation thereof.

In the diagram of FIG. 6 the use and operation of the invention is illustrated in schematic form. The gas flow paths from inlet passageways 54,56 of the two gas circuits, e.g. oxygen and air, are illustrated in flowing from first pressure balance stage 34 into second pressure balance stage 36 for delivery at a precise pressure balance to differential gas mixing device 37. Gas mixing device 37 is illustrated in modified form with valve element 106 sliding within bore 107 on a gas seal 108. Gas is metered outwardly through tapered valve ends 109,111 into orifices 112,113 for delivery through branch passageways 114,116 connecting with outlet bore 117 serving as the mixing chamber.

Various functions of the apparatus may be modified as required by certain design considerations. In the pressure balance stages the maximum gas flow is determined by the size of the openings for the control valves 44,46 and 69,71. The higher the balancing gas pressures, then the smaller the diaphragm and valve area for a given flow and area of accuracy. Also, the lower the durometric values designed for the flexible annulus of the diaphragms, then the greater the response to flow and pressure variations with a concomitant increase in accuracy for a given diaphragmatic area.

The modular design of differential gas mixing device 37 provides flexibility for interchanging differential gas mixing devices of varied valve geometry with the pressure balance stages. The flow limits are controlled by the geometry of valving element 89 in the differential gas mixer. Thus, one turn calibration for a given scale is controlled by reducing the distance between the orifices to contract the calibrated scale, and by increasing this distance to expand the scale. Also, linearization of the calibrated mixing knob 101 can be obtained with two gases of different viscosity and density by suitable design of the geometry of valving element 89. Thus, the valve element diameter in the orifice would be increased to flow a gas of lesser density, and decreased to flow a gas of higher density. Increments of calibration can also be expanded or contracted by changing thread pitch for valve operating shaft 98. A fine thread pitch provides slow travel to spread the calibrated scale and a coarse thread pitch provides faster travel to contract the scale. The radius of control knob 101 can also be increased to expand a calibrated scale. The interchangability of mixing devices 37 having varied design features allows a common pressure balance mechanism to deliver a number of respiratory and anesthetic gases to selected mixing devices calibrated to mix specific gases.

It is apparent from the foregoing that we have provided a new and improved method and apparatus for mixing gases which has many advantageous features. It will be understood that various changes in the details, material, steps, and arrangement of parts, which have been described and illustrated in order to explain the nature of the invention, may be made by those skilled in the art within the principal and scope of the invention as expressed in the appended claims.

We claim:

1. A method for mixing gases from separate pressurized gas circuits in a gas mixing device having a differential gas mixing valve, the gas mixing valve having a pair of orifices opening through a mixing chamber, comprising the steps of controlling the gas flow in each circuit at a respective flow control location, sensing the gas pressure in each circuit at a respective zone downstream of each control location, each zone being in a path which leads without branching from said control location to said gas mixing valve, detecting an imbalance between the downstream pressures at said zones of the two circuits, increasing the gas flow rate through the control location having a lower downstream gas pressure while simultaneously decreasing the gas flow rate through the control location having the higher downstream gas pressure, directing the downstream gases in each circuit across a second flow control location in each of said circuits, sensing the gas pressure in each circuit at a second respective zone downstream of said second control location, each second zone being in a path which leads without branching from said second control location to said gas mixing valve, detecting an imbalance between the pressures downstream of said second control location, increasing the gas flow rate through the second control location having a lower downstream gas pressure while simultaneously decreasing the gas flow rate through the second control location having a higher downstream gas pressure to bring said last mentioned pressures into balance, directing the gas flows from the second zones downstream of the second control locations in respective paths leading across said orifices into the mixing chamber in said differential mixing valve, and reciprocally varying the flow areas of respective orifices to selectively vary the ratio of gas flow rates from the separate circuits which are mixed in the mixing chamber.

2. A method as in claim 1 in which said orifices are disposed at opposite ends of said mixing chamber and a flow control member is disposed within said mixing chamber, and the method includes the step of moving said flow control member axially between said orifices to reciprocally vary said flow areas.

* * * * *